United States Patent [19]

Hashimoto et al.

[11] Patent Number: 4,564,873
[45] Date of Patent: Jan. 14, 1986

[54] MAGNETIC RECORDING AND REPRODUCING APPARATUS

[75] Inventors: Koosuke Hashimoto; Motoyuki Gotoh, both of Nagaokakyo, Japan

[73] Assignee: Mitsubishi Denki Kabushiki Kaisha, Japan

[21] Appl. No.: 429,989

[22] Filed: Sep. 30, 1982

[30] Foreign Application Priority Data

| Oct. 6, 1981 | [JP] | Japan | 56-160632 |
| Oct. 7, 1981 | [JP] | Japan | 56-161734 |
| Oct. 7, 1981 | [JP] | Japan | 56-161735 |
| Oct. 7, 1981 | [JP] | Japan | 56-161736 |
| Oct. 7, 1981 | [JP] | Japan | 56-161737 |
| Oct. 7, 1981 | [JP] | Japan | 56-161738 |
| Oct. 12, 1981 | [JP] | Japan | 56-162248 |

[51] Int. Cl.$^4$ .................. G11B 5/008; G11B 17/00
[52] U.S. Cl. .................................. 360/90; 360/93; 360/96.2; 360/96.3
[58] Field of Search ............. 360/90, 93, 96.1, 96.3, 360/96.5, 105

[56] References Cited

U.S. PATENT DOCUMENTS

| 4,214,283 | 7/1980 | Fushima et al. | 360/105 X |
| 4,399,475 | 8/1983 | Kaisha | 360/96.3 |
| 4,402,026 | 8/1983 | Yokota et al. | 360/105 |

Primary Examiner—John H. Wolff
Attorney, Agent, or Firm—Staas & Halsey

[57] ABSTRACT

A magnetic recording and reproducing apparatus including supply and take-up reel stand gears mounted coaxially with each axis of rotation of a supply reel stand and a take-up reel stand, an idler gear adapted to engage the two gears alternatively and interlocking with an output of a forward and reverse rotation driving mechanism, a head plate for supporting a magnetic head and capable of reciprocating so that the head approaches and separates from the tape, and a pinch roller for clamping a tape against a capstan shaft. The pinch roller is supported so that it can be freely brought close to or separated from the capstan shaft and the head plate is provided with an elastic member which urges the pinch roller close to the capstan shaft. When the head plate travels the head approaches the tape during a period in the middle of traveling to a traveling limit. The apparatus further includes a cam plate having a first cam portion for retaining the idler gear in engagement with the two reel stand gears alternatively and a second cam portion for moving the head plate with reel stand gear engagement retained. The cam plate reciprocates on a rectilinear path and a brake follower for the first cam portion cooperates during the switching of the engagement position of the idler gear for the two reel stand gears. Also included is a head follower mounted on the head plate following the second cam portion.

12 Claims, 12 Drawing Figures

MAGNETIC RECORDING AND REPRODUCING APPARATUS

BACKGROUND OF THE INVENTION

This invention relates to a magnetic recording and reproducing apparatus, and more particularly to a magnetic recording and reproducing apparatus accepting a cassette having a magnetic tape enclosed therein, called a general audio cassette or compact cassette.

Magnetic tape recording and reproducing apparatus generally includes a supply reel stand and a take-up reel stand which are engaged with or disengaged from reels mounted in the cassette, a normal direction capstan shaft and a rewinding direction capstan shaft for moving a magnetic tape at a fixed speed in a normal or rewinding direction respectively, and a magnetic tape head. An apparatus of this type having auto-reverse is used for car stereos, etc. Today, there is a need for a magnetic recording and reproducing apparatus which is simplified in its construction and reliable in operation, while reduced to compact size.

Conventionally, in an apparatus of this kind, each reel stand and capstan shaft are driven by individual driving sources, and the switching of forward and reverse motions of the magnetic tape head is accomplished by a plunger, which causes the structure of a driving system to become complicated. If a slip mechanism using felt is adopted as turning force generating means for the reel stand, it has the disadvantage of lower reliability because the felt wears out. The above disadvantages impede the reduction in size and cost of the apparatus. To decrease the number of driving sources some cassettes have a driving source rotating in only one direction and power is transmitted from the driving source to the reel stands and capstan shafts by a mechanical transmission mechanism. In these one direction drive systems a complex structure is required for switching the direction of rotation of the reel stand and the resulting apparatus is not simple in structure and not compact in size. In view of such problems the present invention has been proposed.

SUMMARY OF THE INVENTION

It is an object of the present invention to provide a magnetic recording and reproducing apparatus which has a simplified driving system.

It is another object of the present invention to provide a compact magnetic recording and reproducing apparatus.

The present invention includes a driving system for transmitting the output of a forward and reverse driving mechanism to a supply reel stand and a take-up reel stand by means of an idler gear. The driving system can urge and release a pinch roller against a capstan shaft in cooperation with the forward and backward motions of a magnetic tape head, thus allowing the mounting and dismounting of a cassette and the desired recording and reproducing in an assured and smooth fashion.

These, together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
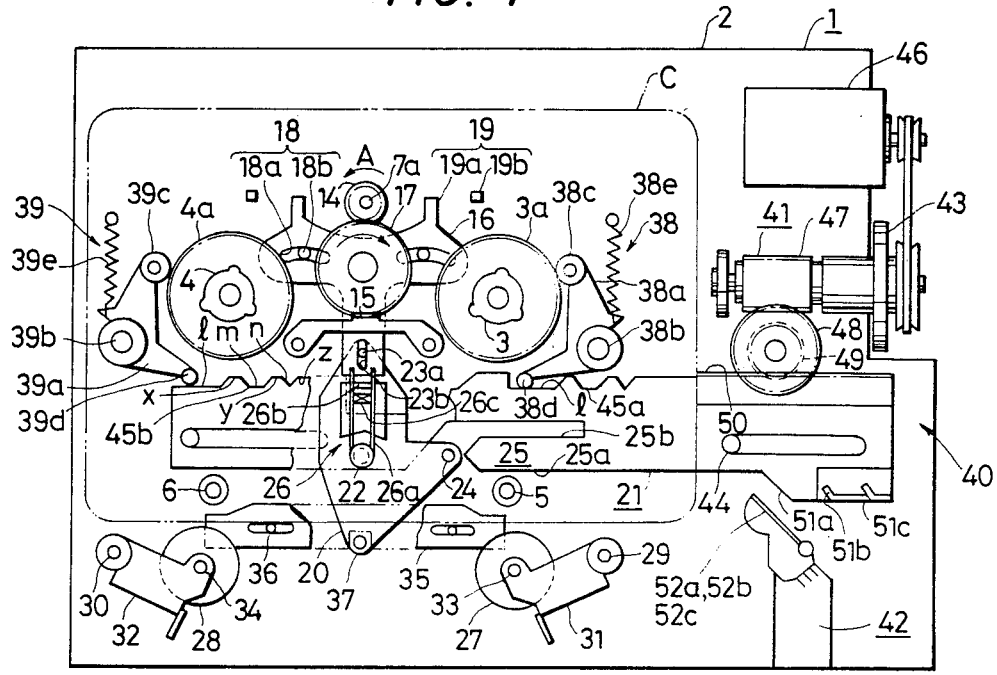
FIGS. 1 to 4 are plan views, with broken away portions, illustrating the operating conditions or positions of a magnetic recording and reproducing apparatus according to the present invention.

In FIGS. 1 to 7, a magnetic recording and reproducing apparatus 1 includes a base plate 2 and is provided with a take-up reel stand 3, a supply reel stand 4, and a normal or forward direction capstan shaft 5 and a rewinding or reverse direction capstan shaft 6 which are opposed each other. A take-up reel stand gear 3a and a supply reel stand gear 4a are integrally a part of the take-up reel stand 3 and the take-up reel stand 4 respectively and respectively coaxially rotate. An output shaft 7a for a forward and reverse rotation driving mechanism 7 is disposed between the two stand gears 3a and 4a.

Figure 8:
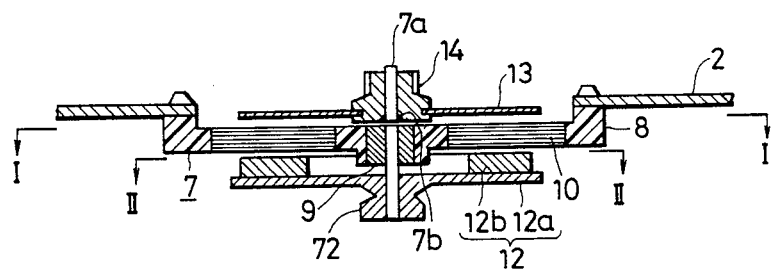
FIG. 8 is a longitudinal sectional view of a forward and reverse rotation driving mechanism.
Figure 9:
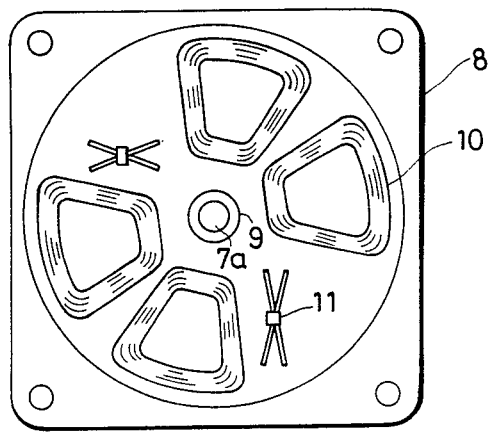
FIG. 9 is a sectional view taken in the direction of the arrows along the line I—I of FIG. 8.
Figure 10:
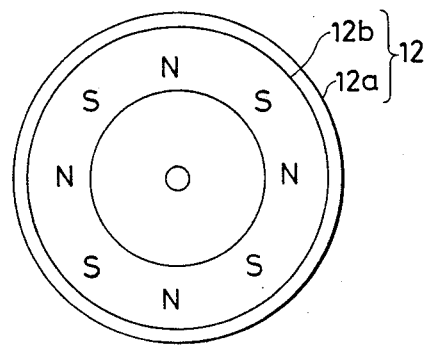
FIG. 10 is a sectional view taken in the direction of the arrows along the line II—II of FIG. 8.

It will be apparent from the following description of FIGS. 8-10, that the forward and reverse rotation driving mechanism 7 functions both as a synchronous motor and an eddy-current motor fixed to the back of the base plate 2. An insulating coil housing 8 (FIG. 8 and 9) threaded or screwed onto the base plate 2 is formed with a bearing 9 positioned at the central portion thereof, a required number of coils 10 and magnetic flux detecting elements 11 (FIG. 9) being disposed around the bearing 9 with a predetermined positional relation therebetween. The output shaft 7a (FIG. 8 and 9) is rotatably fitted in the bearing 9, the lower end of the output shaft 7a being provided with a first rotor 12 (FIG. 8) comprising a rotor disc 12a and a rotor magnet 12b secured thereon. The rotor disc 12a is formed of electromagnetic soft iron plate, and is provided with gear grooves (not illustrated) at the periphery thereof, which allow the detection of the number of rotations of the first rotor 12 using an electromagnetic or optical method to generate a control signal used for controlling the speed of rotation. As illustrated in FIG. 10, the rotor magnet 12b is magnetized with alterations of north (N) and south (S) poles at intervals having a mechanical angle of 45 degrees. The magnetic circuit of the rotor magnet 12b is also used by the rotor disc 12a.

As described above, the driving mechanism functions as a synchronous motor, wherein the magnetic flux detecting element 11 detects the magnetic flux of the rotor magnet 12b, and a driving current is supplied to the coil 10 by a control circuit (not illustrated) to rotate the first rotor 12. When an external synchronous signal is compared with the control signal detected from the rotor disc 12a using the well-known electro-magnetic or optical method, the control of the input to the coil 10, and thus, the number of rotations of the first rotor 12 and the output shaft 7a is controlled as required. The direction of rotation of the output shaft 7a is reversed by well-known means, such as by reversing the polarity of the magnetic flux detecting element 11.

The numeral 13 (FIG. 8) is a second rotor, which is formed of a material having an eddy-current characteristic such as electromagnetic soft iron plate or of a material having a hysteresis magnetization characteristic such as a hard magnetic material like a disc, and which uses the magnetic flux from the rotor magnet 12b in opposition to the first rotor 12. Pinion 14 is formed of a low coefficient of friction material such as plastic, is integrally a part of the second rotor 13 and has a bearing portion at the central portion thereof in such a manner as to be freely rotatable with the output shaft 7a. The bearing portion is rotatably supported in a contact manner on a step portion end surface 7b formed on the central portion of the output shaft 7a. Therefore, the force of attraction produced by magnetic force affects the pinion 14, the second rotor 13 and the rotor magnet 12b, and the force of attraction forces the second rotor 13 to be pressed toward the coils 10 at the step portion end surface 7b through the pinion 14, thereby causing a fixed frictional force at the contact portion between the step portion 7b, rotor 13 and output shaft 7a. Accordingly, when a driving current is supplied to the coil 10 in order to rotate the first rotor 12, the second rotor 13 is induced by the revolving magnetic field to rotate synchronously with rotation of the first rotor 12.

As described above, the driving mechanism functions as an eddy-current motor, wherein when the first rotor 12 rotates, eddy-current torque, hysteresis torque, or torque of both kinds (the kind of torque depends upon material used in forming the second rotor 13) is generated in the second rotor 13, and a turning torque in the same direction as that of rotation of the first rotor 12 is produced in the second rotor 13. Because there is a frictional force, caused by magnetic attraction between the second rotor 13 and the step portion end surface 7b of the output shaft 7a, the turning torque of the first rotor 12 is transmitted to the second rotor 13 and through to the output shaft 7a by the frictional force. Thus, the second rotor 13 is affected by a resultant torque of a magnetic turning torque in the same direction as that of the first rotor 12 and a turning torque of the first rotor 12 transmitted through frictional force between the second rotor 3 and the step portion end surface 7b.

Figure 11:
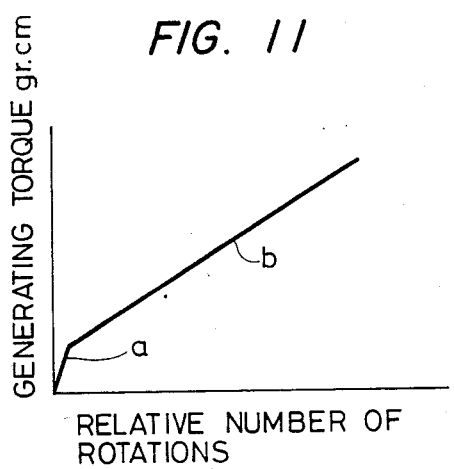
FIG. 11 is a chart illustrating torque versus rotations for the forward and reverse rotation driving mechanism.

FIG. 11 shows a relationship between the resultant torque and the relative number of rotations. This relative rotational frequency results in a difference in the number of rotations between the first rotor 12 and the second rotor 13. In FIG. 11, a curve portion (a) is torque based upon frictional force and illustrates that the torque is produced regardless of the relative rotational frequency, and a curve portion (b) being a torque electromagnetically generated in the second rotor 13 illustrates that the generated torque increases in proportion to the relative number of rotations. Thus, a substantially fixed torque can be output by the turning force of the second rotor 3 regardless of the number of rotations, so that if this torque is used for driving the supply reel stand 3 and the take-up reel stand 4, an almost fixed tape reeling torque can be obtained.

As described before, this turning force can be transmitted through the pinion 14 to the reel stands 3 and 4, so that when the turning force is transmitted to the take-up reel stand 3 and the supply reel stand 4, the reeling torque for the magnetic tape can be kept constant.

As shown in FIGS. 1-4, a rack 15 is secured on the base plate 2 in opposition to the pinion 14 and having a space therebetween, a slide plate 16 is disposed on the base plate 2 mounted between the pinion 14 and the rack 15, and an idler gear 17 is rotatably supported on the slide plate 16. A guide mechanism 18 is mounted between the slide plate 16 and the base plate 2. The guide mechanism 18 comprises a pair of right and left circular guide holes 18a, and a pair of right and left projecting pins 18b which are mounted on the base plate 2 in such a manner as to be fitted in the pair of guide holes 18a. The guide mechanism allows the idler gear 17 to swivel right and left in the vicinity and in engagement with the pinion 14, that is, while the distance between the centers is kept constant. As shown in FIG. 1, the idler gear 17 engages with both the pinion 14 and the rack 15 at the central portion between the take-up reel stand gear 3a and the supply reel gear 4a. When the pinion 14 is turned in the forward direction (counterclockwise) as indicated by arrow A, the idler gear 17 kicks at the rack 15 and swivels in such a manner as to approach the take-up reel stand gear 3a, while turning on its axis clockwise. The guide mechanism 18 is mounted in order to pivot the idler gear 17 in the vicinity of the pinion 14 while in engagement with the pinion 14. A similar type of action occurs when the pinion 14 is turned in the opposite direction (clockwise), that is, the idler gear engages supply reel stand gear 4a. The idler gear 17 is required to pivot between a position where the idler gear 17 engages with the take-up reel stand gear 3a, and a position where it engages with the supply reel stand gear 4a. In such a situation, it is desirable to have the most suitable engagement state when the idler gear 17 locates at the right and left limits of the pivoting motion. For this purpose, a stopper mechanism 19, a plate link 20 and a cam plate 21 are provided.

The stopper mechanism 19 comprises a pair of right and left projecting pieces 19a mounted on the slide plate 16, and right and left engaging pieces 19b mounted on the base plate 2 in opposition to the projecting pieces. When the forward or reverse movement of the idler gear 17 brings the projecting piece 19a and the engaging piece 19b which are opposite each other into contact, the idler gear 17 is located at the limit of pivoting, and the idler gear engages the take-up reel stand gear 3a or the supply reel stand gear 4a in the most suitable position. The plate link 20 is pivotably supported on the base plate 2 at the central portion thereof by a pin 22, and an engaging pin 23a mounted on the end of the plate link 20 is engaged in a fitting manner with an elongated hole 23b, formed in the slide plate 16. The plate link 20 is provided with a follower 24 at one side of an L-shaped portion supported by the pin 22, to which a first cam portion 25 of the cam plate 21 is opposed. The first cam portion 25 is opposed to the side of the follower 24, and has two cam surfaces 25a and 25b symmetrical to each other, as illustrated in FIG. 1. When the slide plate 16 moves to the right or left with the idler gear 17, corresponding to the forward or reverse rotation of the pinion 14, the plate link 20 connected to the slide plate 16 through the engaging pin 23a moves to the right or left in the vicinity of the pin 22, so that an advance of the cam plate 21 just after such movement causes the follower 24 to follow one of the cam surfaces 25a or 25b of the first cam portion 25, whereby even after the idler gear 17 is disengaged from the rack 15, such movement is continued, and the idler gear is set in the most suitable engagement state by the stopper mechanism 19.

A location mechanism 26 for the idler gear 17 is mounted between the link plate 20 and the base plate 2. The location mechanism 26 comprises a torsion spring 26a hooked on the pin 22, a pair of leg portions thereof facing on both sides a cut and let upward piece or bent tab 26b of the plate link 20 and a fixed projecting piece 26c mounted on the base plate 2, which are both projected between the pair of leg portions. When the plate link 20 moves to the right and left, the location mechanism 26 is adapted to urge the plate link 20 in such a manner as to be restored to its original state, that is, the state illustrated in FIG. 1. Therefore, the idler gear 17 is always urged to a neutral position as indicated in FIG. 1.

Pinch rollers 27 and 28 are mounted opposite a pair of capstan shafts 5 and 6, respectively. The pinch rollers 27 and 28 are fixed to support shafts 29 and 30 projected from the base plate 2 through swivel arms 31 and 32, and rotating support shafts 33 and 34 for the pinch rollers 27 and 28 are extended to the vicinity of the base plate 2 surface. The moving path of the rotating support shafts 33 and 34 in the periphery of the support shafts 29 and 30 permits one and the other ends of a stopper plate 35 to advance and retreat therein. The stopper plate 35 is retained on the base plate 2 by a guide mechanism 36 in such a manner as to be slidable right and left, the longitudinal central portion of which being engaged with an engaging pin 37 mounted on the other end of the plate link 20. Accordingly, the stopper plate 35 slides to the right and left, in cooperation with the right and left pivoting of the plate link 20, so as to advance and retire one or the other end thereof in the above-described moving path.

Braking mechanisms 38 and 39 are disposed corresponding to the take-up reel stand gear 3a and the supply reel stand gear 4a. The braking mechanism 38 disposed corresponding to the takeup reel stand gear 3a is supported on a support shaft 38b and has a bent portion of reverse-doglegged swivel piece 38a capable of moving above the base plate 2. The swivel piece 38a has a rubber brake shoe 38c, as an operating portion, at one end thereof and a follower 38d at the other end thereof. A spring 38e for urging the brake shoe 38c against the take-up reel stand gear 3a in contact pressure therewith is interposed between the swivel piece 38a and the base plate 2. The braking mechanism 39 disposed in a position corresponding to the supply reel stand gear 4a is positioned symmetrically with the braking mechanism 38. Swivel piece 39a, support shaft 39b, brake shoe 39c, follower 39d and spring 39e are similar to those described for brake mechanism 38.

Control mechanism 40 is for changing the operating condition of the braking mechanisms 38 and 39. The control mechanism 40 comprises the above-described cam plate 21, a cam plate driving mechanism 41 for advancing and retreating the cam plate 21, a position detecting mechanism 42 for the cam plate 21 and a manual operating mechanism 43 for manually advancing and retreating the cam plate 21. In the FIGS. 1-4, a manual dial is shown as the manual operating mechanism 43.

The cam plate 21 is disposed above the above-described plate link 20 in such a manner as to cover it and is retained on the base plate 2 by a guide mechanism 44 in such a manner as to be slidable right and left. The cam plate 21 includes the first cam portion 25 and two braking cam portions 45a and 45b corresponding to the followers 38d and 39d of the above-described braking mechanisms 38 and 39. These braking cam portions 45a and 45b each have three concave portions l, m and n and three convex portions x, y and z which alternate therealong. When the followers 38d and 39d follow the concave portions l, m and n, the brake shoes 38c and 39c are brought into pressure contact with the take-up reel stand gear 3a and the supply reel stand gear 4a by the springs 38e and 39e, so as to be in the brake operating condition. On the other hand, when the followers 38d and 39d follow the convex portions x, y and z, the brake shoes 38c and 39c are separated from each stand gear 3a and 4a against the spring 38e and 39e, so as to be in a brake non-operating condition.

The cam plate driving mechanism 41 comprises a worm 47 interlocking with a motor 46 capable of turning in the forward and reverse directions, a worm wheel 48 engaging the worm 47, a pinion 49 mounted on the worm wheel 48 integrally therewith and a rack 50 formed on the trailing end of the cam plate 21, which is engaged with the pinion 49.

The cam plate position detecting mechanism 42 comprises kicking pieces 51a, 51b and 51c (FIG. 1), mounted on the trailing end of the cam plate 21, which are vertically arranged with a predetermined positional relation therebetween and limit switches 52a, 52b and 52c mounted on the base plate 2 corresponding to the above-described kicking pieces. The limit switches 52a, 52b and 52c are kicked by each kicking piece 51a, 51b and 51c in dependence upon the forward and backward movements of the cam plate 21, so that each limit switch 52a, 52b and 52c can be switched individually and the cam driving mechanism 41 can be started or stopped.

Figure 4:
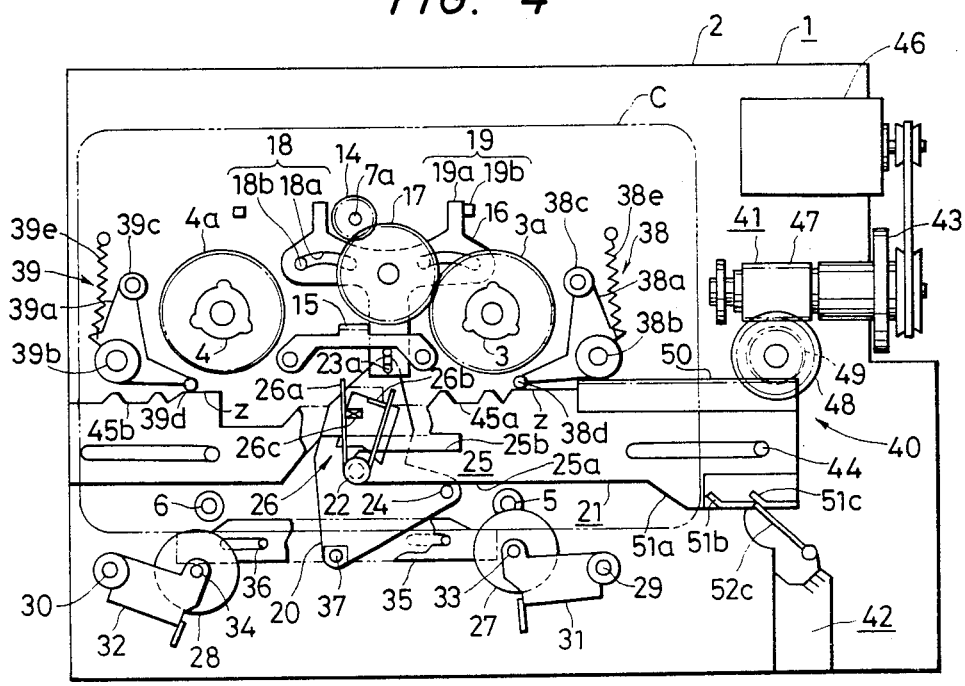
Figure 5:
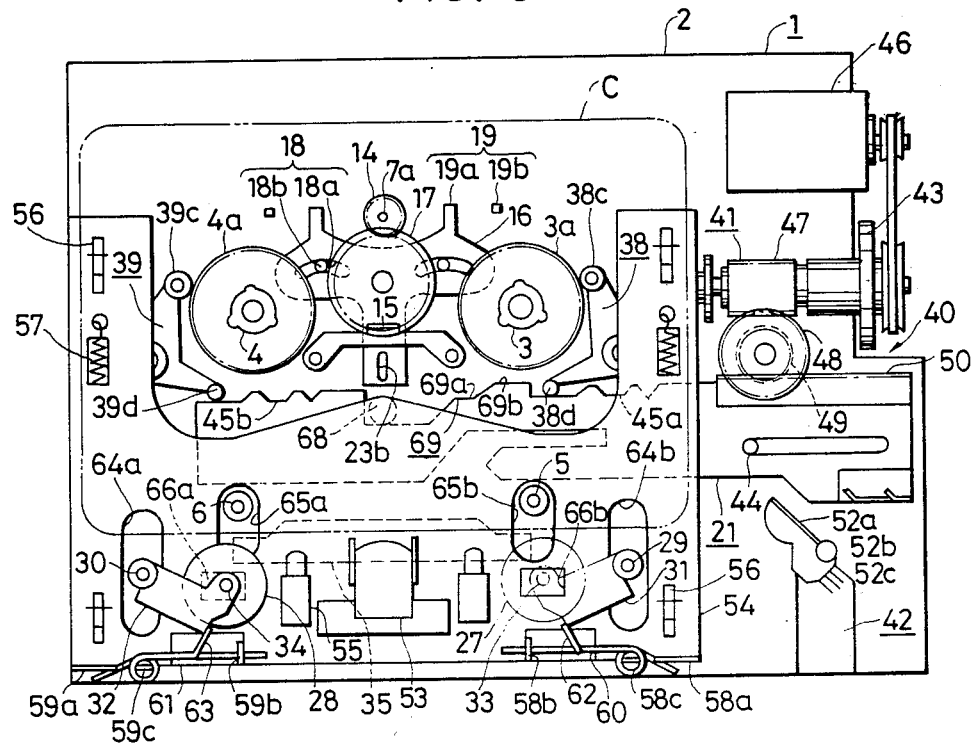
FIGS. 5 to 7 are other plan views illustrating the above-mentioned medtioned conditions or positions.
Figure 6:
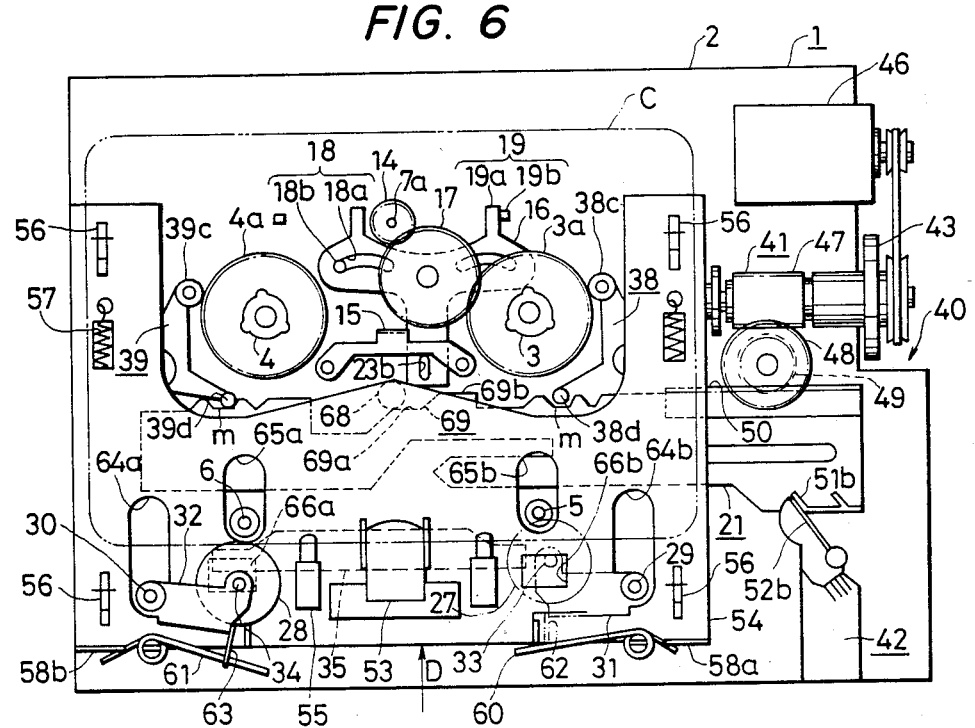
Figure 7:
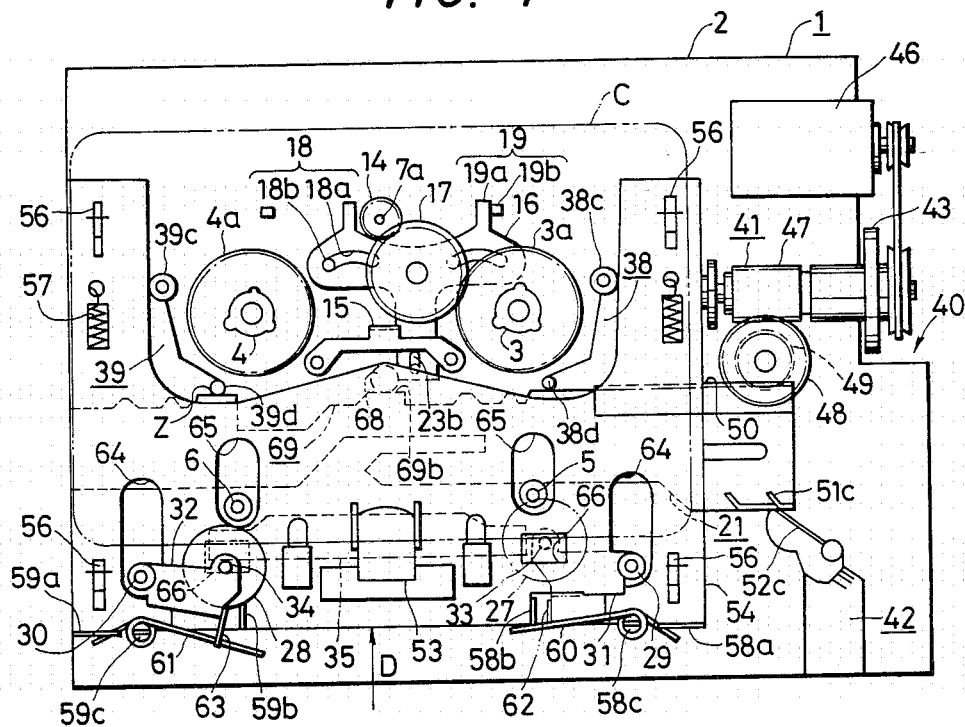

In FIGS. 5-7, FIG. 5 corresponds to FIG. 1 and FIG. 7 corresponds to FIG. 4. A magnetic tape head 53 and an erasing head 55 are fixed to a head plate 54. The head plate 54 is disposed in such a manner as to cover the upper surface of the cam plate 21 and is adapted to reciprocate on the base plate 2 in a direction orthogonal to the sliding direction of the cam plate 21 by the force of guide rollers 56 mounted on each portion of the head plate 54. A spring 57 for urging the head plate 54 in a returning direction is interposed between the head plate 54 and the base plate 2. The leading edge of the head plate 54 is provided with a pair of cut and let upward or upward bent tab pieces 58a, 58b, 59a and 59b on the left and right sides thereof, springs 60 and 61 being respectively suspended therebetween from the outside. Spring shoes 62 and 63 for receiving the springs 60 and 61 are mounted on the swivel arms 31 and 32 of the pinch rollers 27 and 28. Cut and let upward pieces 58c and 59c (FIG. 7) are for supporting the springs 60 and 61. Holes 64a, 64b, 65a, 65b, 66a and 66b prevent the support shafts 29 and 30, the capstan shafts 5 and 6 and the rotating support shafts 33 and 34 of the pinch rollers 27 and 28 from interfering with the head plate 54. The head plate 54 has a follower 68 at the central portion, which is adapted to follow a second cam portion 69 mounted on the above-described cam plate 21. The second cam portion 69 is formed between the two braking cam portions 45a and 45b, and is provided with an intermediate step portion 69a for head advance and an end step portion 69b for recording and reproducing.

The operation of the elements is well timed by the first cam portion 25, braking cam portions 45a and 45b and second cam portion 69.

Figure 12:
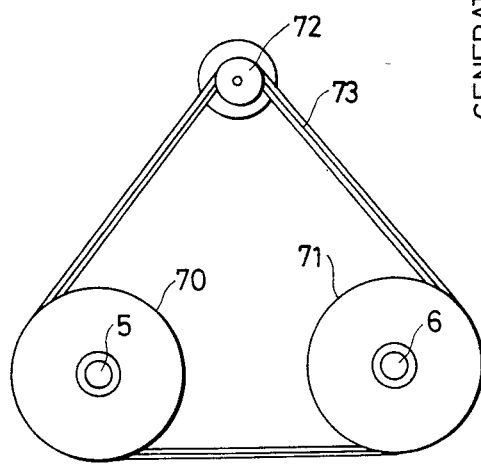
FIG. 12 is a bottom end view of a capstan shaft driving system.

In FIG. 12, pulleys 70 and 71 are secured on each lower end of the capstan shafts 5 and 6 on the back side of the base plate 2, and the first rotor 12 of the forward and reverse rotation driving mechanism 7 is formed with a pully 72 attached thereto. A transmission belt 73 is fitted around the pulleys 70–72.

FIGS. 1–5 illustrate loading and unloading of a cassette c in the magnetic recording and reproducing apparatus 1. The idler gear 17 is brought into engagement with both the pinion 14 and the rack 15 by the action of the location mechanism 26 and retained at a neutral position where it engages with neither the take-up reel stand gear 3a nor the supply reel stand gear 4a. Therefore, the stopper plate 35 is held at a position where it will not project into the moving path of the rotating support shafts 33 and 34. The cam plate 21 is retained at the retiring limit by the cam plate driving mechanism 41, and the first cam portion 25 is disengaged from the follower 24 of the plate link 20. The followers 38d and 39d of the braking mechanisms 38 and 39 follow the first concave portions 1 of the braking cam portions 45a and 45b, and the follower 68 of the head plate 54 follows the concave portion of the second cam portion 69, so that the braking mechanisms 38 and 39 are operated to brake the take-up reel stand 3 and the supply reel stand 4, and the head plate 54 and the magnetic head 53 are positioned at the retiring limit. At this time, the energy of the springs 60 and 61 does not act upon the swivel arms 31 and 32, and the rotating support shafts 33 and 34 of the pinch rollers 27 and 28 are retained in such a manner as to be slightly movable in the interior of the square holes 66a and 66b.

Figure 2:
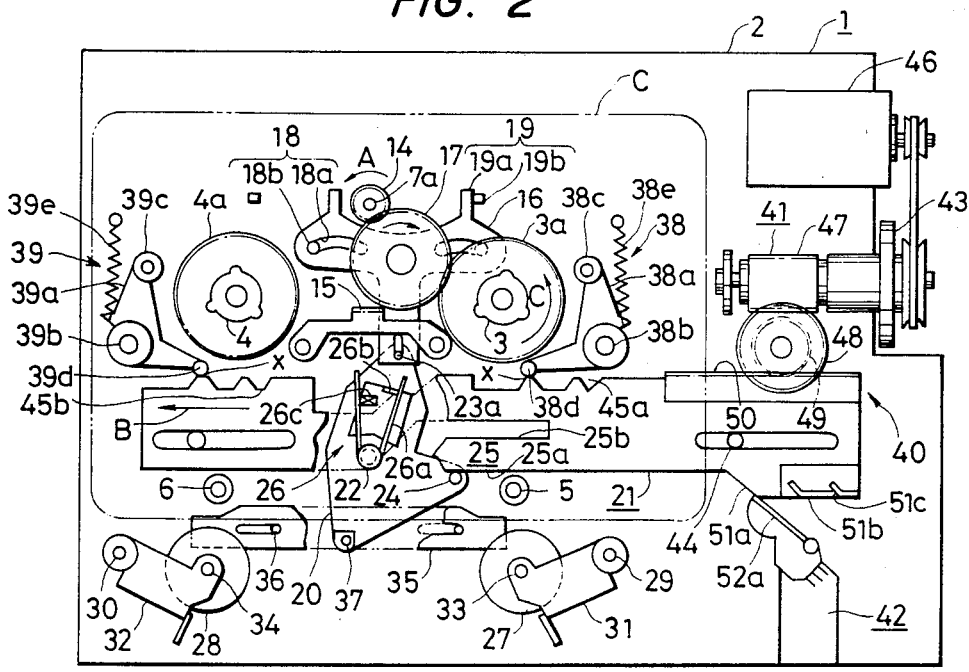

FIG. 2 illustrates the fast forward or the quick-feeding of the magnetic tape in the normal direction after loading of the cassette c. In this case, as the pinion 14 is turned in the direction of the arrow A by the starting of the forward and reverse rotation driving mechanism 7, the idler gear 17 kicks at the rack 15 while turning on its axis, that is, it is turned in the direction of approaching the take-up reel stand gear 3a by the feed of the rack 15. With this movement, the plate link 20 is turned clockwise against the urging of the location mechanism 26, and simultaneously the cam plate driving mechanism 41 starts, so that the cam plate 21 advances in the direction of arrow B. When the followers 38d and 39d of the braking mechanisms 38 and 39 are forced to follow the first convex portions x of the braking cam portions 45a and 45b of the cam plate 21, the first kicking piece 51a of the cam plate 21 kicks at the limit switch 52a corresponding thereto, so that the cam plate driving mechanism 41 stops operating in response to the position detecting signal. Since the follower 24 of the plate link 20 is forced to follow the first cam portion 25, the idler gear 17 is detached from the rack 15 and engages with the take-up reel stand gear 3a and continues to rotate. Accordingly, the take-up reel stand gear 3a is turned in the direction of arrow C to quick-feed or fast forward the magnetic tape in the normal direction. The engagement of the idler gear 17 with the take-up reel stand gear 3a is set in a suitable position by the stopper mechanism 19. The pinch rollers 27 and 28 keep the same condition as that illustrated in FIG. 1.

Figure 3:
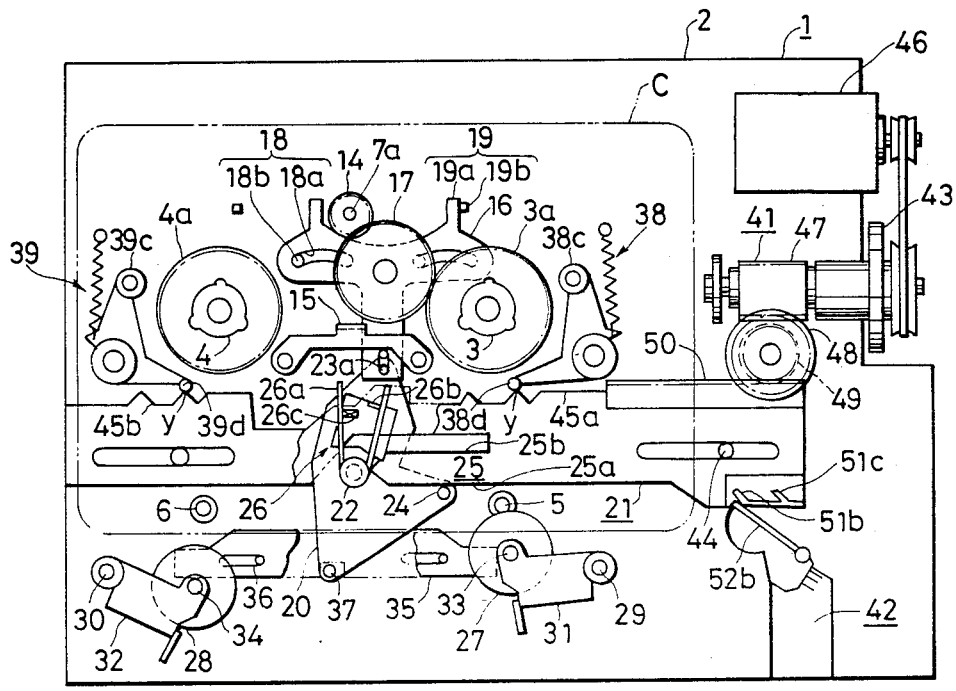

FIGS. 3, 4, 6 and 7 illustrate recording and reproducing in the normal direction after the magnetic tape is quickly fed in the normal direction. When the cam plate 21 is advanced by starting of the cam plate driving mechanism 41, as shown in FIG. 6, the followers 38d and 39d of the braking mechanisms 38 and 39 are forced to follow the second concave portions m of the braking cam portions 45a and 45b and breaking occurs, so that the quick feed of the take-up reel stand 3 and the supply reel stand 4 are stopped. Then, the cam plate 21 advances, and as shown in FIG. 3, the followers 38d and 39d are forced to follow the second convex portions y of the braking cam portions 45a and 45b, and the above braking condition is cancelled. In this condition, the position of the cam plate 21 is detected by the third limit switch 52c and its corresponding kicking piece 51c, and the detecting signal stops the operation of the cam plate driving mechanism 41 stopping the advance of the cam plate 21. In such a situation, the take-up reel stand gear 3a and the supply reel stand gear 4a are free from braking. On the other hand, during the above-described course of operation, the follower 68 of the head plate 54 is forced to follow the intermediate step portion 69a of the third cam portion 69 and then end step portion 69b. The magnetic tape head 53 advances along with the head plate 54, as illustrated by an arrow D in FIGS. 6 and 7, and the magnetic tape head 53 is brought into contact with the magnetic tape. As the head plate 54 advances, the springs 60 and 61 mounted on the head plate 54 urge the pinch rollers 27 and 28 into pressure contact with the spring shoes 62 and 63 of the pinch roller swivel arms 31 and 32. In this case, the support shafts 33 and 34 move with the head plate 54 in engagement with one edge of the square holes 66a and 66b. As one side end portion of the stopper plate 35 projects into the moving path of the rotating support shaft 34 of the rewinding pinch roller 28, the described urging impedes the swivel of the rewinding pinch roller 28 before it is brought into pressure contact with the capstan shaft 6. Accordingly, when the head plate 54 reaches the limit of moving, only the normal direction pinch roller 27 is elastically brought into pressure contact with the capstan shaft 5. FIGS. 4 and 7 illustrate the above-described condition.

FIGS. 4 and 7 illustrate the condition in which the magnetic tape is fed in the normal direction corresponding to the speed of rotation of the capstan shaft 5, and the take-up reel stand 3 and the supply reel stand 4 rotate in synchronism with the take-up speed and draw-out speed of the magnetic tape, and at that time, the reeling torque becomes constant. The output of the forward and reverse rotation driving mechanism transferred by the pinion 14 is the described resultant torque, which is always constant if the speed of rotation of the first rotor 12 is kept constant.

The above description deals with the case after the quickfeed of the magnetic tape in the normal direction when it is regularly fed in the same direction. In the magnetic recording and reproducing apparatus of this type, it is possible to perform the forward quick-feed, regular feed and stop, the rewinding quick-feed, regular feed and stop, and the further head advance of the magnetic head 53 in any desired order. Accordingly, it is desirable that while changing from one operation to another (ex. forward to reverse), that the cam plate 21 return to the limit of backward movement as shown in FIGS. 1 and 5. Such a construction can be easily accomplished by using a microcomputer.

When the cassette c must to be taken out because a power supply (ex. a battery) has run down while the magnetic tape is running, a manual dial as a manual operating mechanism 43 is rotated to manually return the cam plate 21 to the limit of backward movement and the clamping of the magnetic tape against the capstan shafts 5 and 6 by the pinch rollers 27 and 28 is cancelled to unload the cassette c. The manual operating mechanism 43 is also used for adjusting the engagement of the idler gear 17 with the take-up reel stand gear 3a and the supply reel stand gear 4a. For example, as shown in FIG. 3, the idler gear 17 is engaged with the take-up reel stand gear 3a, and then the cam plate 21 is returned to the limit of backward movement by the manual operating mechanism 43 to brake the take-up reel stand gear 3a. Subsequently, a similar operation is performed for the supply reel stand gear 4a.

It will be apparent that as described above, in accordance with this invention, if only the direction of rotation of the output shaft of a forward and reverse rotation driving mechanism is changed, the forward and rewinding turning forces can be alternatively and automatically transmitted to a supply reel stand gear and a take-up reel stand gear, so that it is possible to eliminate the need for mounting driving motors for each reel stand or the need for a complicated transmission mechanism. Thus, the construction of the driving system and apparatus can be simplified and reduced in size, resulting in a dramatic cost reduction. According to this invention, since a pinch roller is urged in the direction toward the capstan shaft from a middle position of operation as the magnetic head approaches the tape, the urging force will not act upon the pinch roller at the time of loading and unloading the cassette, which can prevent the occurrence of unexpected malfunctions, for example where the tape is clamped between the pinch roller and the capstan shaft during loading and unloading the cassette.

A control mechanism for controlling the braking mechanisms of the above two reel stand gears is provided with a cam plate, and the cam plate is adapted to change the condition of the braking mechanism and to control the reciprocation of the cam plate itself and to control the starting and stopping of the cam plate driving mechanism for reciprocating the cam plate, so that the switching of the operating condition of the braking mechanism can be positively and properly timed. Since the operation of the braking mechanism for each gear corresponds to the changeover of engagement with the idler gear and the movement of the magnetic tape by the control mechanism, the recording and reproducing operation can be assured. According to this invention, an idler gear is adapted to swivel to transmit a turning force to the supply reel stand gear and the take-up reel stand gear, with the forward and reverse rotation of a pinion interlocking with an output shaft of the forward and reverse rotation driving mechanism, and the limit of swivel of the idler gear is regulated by a stopper mechanism, so that if the regulating position is set in such a manner that the idler gear is brought into engagement with each reel stand gear in the most suitable position, the backlash of each reel stand gear can be prevented and the assured change in traveling direction of the magnetic tape and the stopping thereof can be accomplished. The idler gear for transmitting the turning force to the two reel stand gears is supported on a slide plate, which is guided by a guide mechanism mounted between the slide plate and a base plate. Even if the idler gear swivels in the vicinity of the pinion interlocking with the output shaft of the forward and reverse rotation driving mechanism, the engagement of the idler gear with the pinion is maintained. Accordingly, the engagement of the idler gear with the supply reel stand gear and the take-up reel stand gear can be set so that reliable operation can be expected.

The control mechanism for controlling the braking mechanisms of the two reel stand gears is provided with a cam plate. The operating portion of the braking mechanism is adapted to follow the cam plate, which is reciprocated by a manual operating mechanism, whereby even if an expected malfunction occurs, such as the battery running down, the cassette can be easily removed.

The many features and advantages of the invention are apparent from the detailed specification and thus it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A magnetic recording and reproducing apparatus having a pair of magnetic tape reels and a magnetic tape, comprising:
   a base plate;
   a forward and reverse rotation driving mechanism having an output shaft rotating one of forward and reverse directions;
   first and second reel gears each having a rotation shaft and each of said first and second reel gears for driving the pair of magnetic tape reels, said first and second reel gears being rotatably supported by the rotation shafts attached to the base plate at a predetermined distance from the base plate;
   a pinion being disposed between said first and second reel gears and in rotatable contact with the output shaft for rotating in one of the forward and reverse directions, said pinion being rotated in association with the output shaft of the forward and reverse rotation driving mechanism;
   an idler gear engaged with said pinion and being pivotable between two engage positions to selectively engage one of said first and second reel gears; and
   a rack secured to said base plate, said rack being engaged with said idler gear at an approximately center position between the two engage positions, and said rack providing a feeding force to said idler gear through one of the forward and reverse direction rotations of said pinion.

2. An apparatus as recited in claim 1, further comprising:
   a swing member supporting said idler gear, said swing member being fed by said idler gear and said rack; and
   shifting means for shifting and swinging said swing member into one or the other of the two engage positions.

3. An apparatus as recited in claim 2, further comprising guiding means for guiding said swing member.

4. An apparatus as recited in claim 3, wherein said swing member has a guide hole, and wherein said guiding means comprises a protruding pin formed in said base plate protruding into the guide hole.

5. An apparatus as recited in claim 2, wherein said shifting means is operated by the feeding force of said rack.

6. An apparatus as recited in claim 2, wherein said shifting means is a cam portion.

7. An apparatus as recited in claim 1, further comprising a stop mechanism for stopping the pivotal movement of said idler gear.

8. An apparatus as recited in claim 1, further comprising a brake mechanism disposed corresponding to said first or second reel gears capable of contacting said first or second reel gears to perform a braking action of said first or second reel gears.

9. An apparatus as recited in claim 8, further comprising control means for operating said brake mechanism in dependence upon the switching of the engagement between said idler gear and one of said first and second reel gears and for terminating the operation of said brake mechanism during the running of said magnetic tape mounted.

10. The apparatus as recited in claim 9, wherein said brake mechanism has an operating portion, and wherein said control means comprises:
a cam plate movable in response to said operating portion of said brake mechanism;
a driving mechanism in contact with said cam plate and providing reciprocating movement to said cam plate within a linear path and having operable and non-operable states; and
cam plate position detecting means, in contact with said cam plate, for detecting a position of said cam plate, for generating a detection signal and for switching said driving mechanism between the operable state and non-operable state in response to the detection signal in dependence upon said cam plate position.

11. An apparatus as recited in claim 9, wherein said brake mechanism has an operating portion, and wherein said control means comprises:
a cam plate being movable in response to the operating portion of said brake mechanism and being reciprocated in a linear path; and
manual means for reciprocating said cam plate.

12. An apparatus as recited in claim 1, further comprising:
a magnetic head;
a head plate supporting said magnetic head;
a capstan shaft positioned on one side of the magnetic tape;
a pinch roller positioned on the other side of the magnetic tape and capable of contacting said head plate and clamping the magnetic tape against said capstan shaft;
an elastic member attached between said head plate and said base plate, said head plate being capable of reciprocating in such a manner that the magnetic head approaches and separates from said tape, said pinch roller being supported in such a manner as to be freely brought close to or separated from said capstan shaft, said head plate, due to said elastic member, urges said pinch roller close to said capstan shaft, when said head plate travels said magnetic head approaches the magnetic tape during a period in the middle of traveling to a traveling limit;
a cam plate having a first cam portion for retaining said idler gear in engagement with said first and second reel gears alternatively and a second cam portion for moving said head plate with said idler gear engagement retained, said head plate reciprocating on a rectilinear path;
a brake follower in contact with the first cam portion, cooperating during an operation of switching the engagement position of said idler gear for said first and second reel gears and being positioned by said first cam portion; and
a head follower in contact with the second cam portion, mounted on said head plate and being positioned by said second cam portion.

* * * * *